United States Patent [19]
Lundgreen et al.

[11] Patent Number: 6,129,339
[45] Date of Patent: Oct. 10, 2000

[54] STRUT SPRING COMPRESSION

[75] Inventors: James M. Lundgreen, Owatonna; Larry W. Betcher, Northfield, both of Minn.

[73] Assignee: SPX Corporation, Muskegon, Mich.

[21] Appl. No.: 09/255,124

[22] Filed: Feb. 22, 1999

[51] Int. Cl.[7] ...................................................... B23P 19/04
[52] U.S. Cl. ........................................................ 254/10.5
[58] Field of Search ...................... 254/10.5; 29/225–227, 29/215–218, 259

[56] References Cited

U.S. PATENT DOCUMENTS

| | | |
|---|---|---|
| D. 259,538 | 6/1981 | Bowling . |
| 3,341,175 | 9/1967 | Branick . |
| 3,764,107 | 10/1973 | Mlynarczyk ............................ 254/10.5 |
| 3,814,382 | 6/1974 | Castoe . |
| 3,912,224 | 10/1975 | Castoe ................................... 254/10.5 |
| 3,982,730 | 9/1976 | Otsuka . |
| 4,034,960 | 7/1977 | Kloster . |
| 4,036,473 | 7/1977 | Kloster . |
| 4,219,918 | 9/1980 | Klann . |
| 4,237,594 | 12/1980 | Young . |
| 4,276,684 | 7/1981 | Mattson . |
| 4,295,634 | 10/1981 | Spainhour et al. . |
| 4,395,020 | 7/1983 | Spainhour . |
| 4,442,580 | 4/1984 | Antoniadis . |
| 4,502,664 | 3/1985 | Bendickson et al. . |
| 4,516,303 | 5/1985 | Kloster . |
| 4,541,614 | 9/1985 | Klann . |
| 4,558,500 | 12/1985 | Kloster . |
| 4,568,063 | 2/1986 | Gramlich . |
| 4,785,519 | 11/1988 | Krueger . |
| 5,031,294 | 7/1991 | Krueger . |
| 5,172,462 | 12/1992 | Ha . |
| 5,172,889 | 12/1992 | Post et al. .............................. 254/10.5 |
| 5,680,686 | 10/1997 | Bosche et al. . |

FOREIGN PATENT DOCUMENTS

| | | | |
|---|---|---|---|
| 4212482A1 | 4/1992 | Germany ............................. | 254/10.5 |

OTHER PUBLICATIONS

Kowa Seiki; Strut Spring Compressor sales flyer (admitted prior art).

RTI Strut Spring Compressor sales flyer (admitted prior art).

MAC Tools Hydraulic Strut Spring Compressor sales flyer (admitted prior art).

MacPherson Strut Tools/Hydraulic Jack Oil catalog information (admitted prior art).

J. One Automotive Tools Co., MacPherson Strut Springs Compressor sales flyer (admitted prior art).

*Primary Examiner*—Robert C. Watson
*Attorney, Agent, or Firm*—Hovey, Williams, Timmons & Collins

[57] ABSTRACT

A strut spring compressor (20) having a support frame (22), a plurality of pivot arms (24, 26, 28, 30), a plurality of spring clamps (32, 34, 36, 38), and an actuating mechanism (40) is utilized to compress and expand a spring (42) of a strut assembly (44) whereby maintenance can be performed on the strut assembly (44). Each of the pivot arms (24–30) is pivotally attached to the support frame (22) by ball joints (74) which permit the arms (24–30) to pivot independently and three-dimensionally to compensate for a variety of spring sizes, and the spring clamps (32–38) are pivotally attached to the arms (24–30) to compensate for a variety of spring pitches. The actuating mechanism (40) includes a forcing screw (116) pivotally joined to a top trunnion assembly (118) and threadably engaging a middle trunnion assembly (120) and a bottom trunnion assembly (122). The forcing screw (116) includes a middle threaded portion (136) threadably engaging the middle trunnion assembly (120) and a lower threaded portion (138) threadably engaging the bottom trunnion assembly (122). The lower thread pitch is twice the middle thread pitch, so that the arms maintain substantially the same magnitude of angle with respect to the support frame (22).

10 Claims, 7 Drawing Sheets

STRUT SPRING COMPRESSION

BACKGROUND OF THE INVENTION

1. Field of the Invention

This invention relates generally to automotive tools and fixtures and more particularly, to fixtures for use in assembling and disassembling strut assemblies having a shock absorber axially disposed within a helical, coil spring.

2. Description of Prior Art

Certain types of automotive suspension systems, such as the MacPherson-type, include a suspension subassembly. The subassembly includes a shock absorber and a strut spring, and is often referred to as a strut assembly. The shock absorber or damper consists of a piston within the body of the shock absorber connected to a piston rod which projects upwardly from the shock absorber in a telescoping fashion. A coil spring is mounted in a compressed state around the piston rod and body of the shock absorber between a lower spring seat integral with the body of the absorber and an upper spring seat fastened to the upper end of the piston rod of the shock absorber. Such a suspension subassembly is mounted as a unit in the vehicle body and is disassembled, serviced, and reassembled separately.

Disassembly of the strut assembly is accomplished by compressing the coil spring using a suitable tool or fixture to remove pressure from the spring seats of the strut assembly. Having done so, the fastener holding the piston rod to the upper spring seat can be removed. This fastener variously takes the form of a nut or retaining ring which fastens above the upper spring seat to the piston rod retaining all components of the strut assembly. The shock absorber and lower spring seat can then be removed leaving the spring in a compressed state within the tool. If required, the spring can then be decompressed and removed. In most cases, the coil spring must be compressed by engaging the spring itself between the upper and lower spring seats rather than engaging the upper spring seat and spring.

New or serviced components can be reassembled following the reverse of the foregoing process. Namely, with the spring in a compressed state, the shock absorber is placed axially through the spring such that the piston rod protrudes beyond the coil spring upper end and the lower spring seat contacts the lower end of the compressed spring. The appropriate fastener is attached to the piston rod above the upper spring seat. The strut assembly is then gradually released from the tool and is ready for reinstallation in the vehicle.

Numerous apparatus have been developed to assist in the assembly and disassembly of a strut suspension system, but with the design and development of newer and different types of strut assemblies, it has become desirable to have an apparatus which can accept a wide variety of different types of strut assemblies and different types and sizes of MacPherson strut assemblies without the use of adapters or an overly bulky structure. It is also desirable that the apparatus is able to be quickly adapted by the operator to accept a particular sized strut assembly for quick and efficient assembling and disassembling. It is also important to ensure that the apparatus can securely engage and retain a spring to ensure the safety of an operator because the springs are compressed under a large force which, if released without control, could injure an operator and damage property.

SUMMARY OF THE INVENTION

The present invention solves the problems mentioned above and provides a distinct advance in the state of the art. In particular, the invention is directed to a spring compressor which includes a substantially rigid support frame and a plurality of arms attached to the support frame. Spring engagement devices are attached to the arms for engaging and holding a spring. An actuating mechanism is operatively coupled with the plurality of arms to move the arms relative to each other and compress the spring.

In a preferred embodiment, the plurality of arms include a pair of upper arms and a pair of lower arms which are movably attached to the support frame by ball joints permitting the arms to pivot three-dimensionally. The upper arms are joined to each other by a top trunnion assembly pivotally coupled with a forcing screw of the actuating mechanism. The top trunnion assembly includes a cylindrical top trunnion and two top pivot bearings. The top pivot bearings slidably receive the cylindrical top trunnion and are pivotally held by the upper arms, so that the top trunnion pivots relative to the forcing screw and the upper arms; and so that the distance between the upper arms can be adjusted.

The attachment mechanism also includes a middle trunnion assembly and a bottom trunnion assembly. The middle trunnion assembly is similar to the top trunnion assembly but threadably receives a middle threaded portion of the forcing screw and pivotally connects to the lower arms. Because the middle trunnion assembly is pivotally attached to the lower arms, the lower arms pivot independently of the upper arms. The bottom trunnion assembly includes an arcuate trunnion plate slidably received in trunnion slots defined by the support frame. The trunnion plate is preferably slidable side-to-side and front-to-back within the trunnion slots. The trunnion plate also preferably includes a plurality of lock slots which operate to lock the trunnion plate from sliding side-to-side. The trunnion plate threadably receives a lower threaded portion of the forcing screw which has a lower thread pitch twice the middle thread pitch, so that the upper and lower arms extend at substantially the same magnitude of angle relative to the support frame.

The spring engagement devices preferably comprise spring clamps each having a pivotal base member pivotally attached to an arm and a clamp finger movable between a clamped position and a retracted position. The base member pivots to match the pitch angle of the strut spring. The spring clamps also include lock collars which engage the clamp fingers to lock the clamp fingers in the clamped position. The base member and clamp finger preferably have arced spring engagement surfaces to clamp a spring coil therebetween.

BRIEF DESCRIPTION OF THE DRAWINGS

A preferred embodiment of the present invention is described in detail below with reference to the attached drawing figures, wherein.

DETAILED DESCRIPTION

Figure 1:
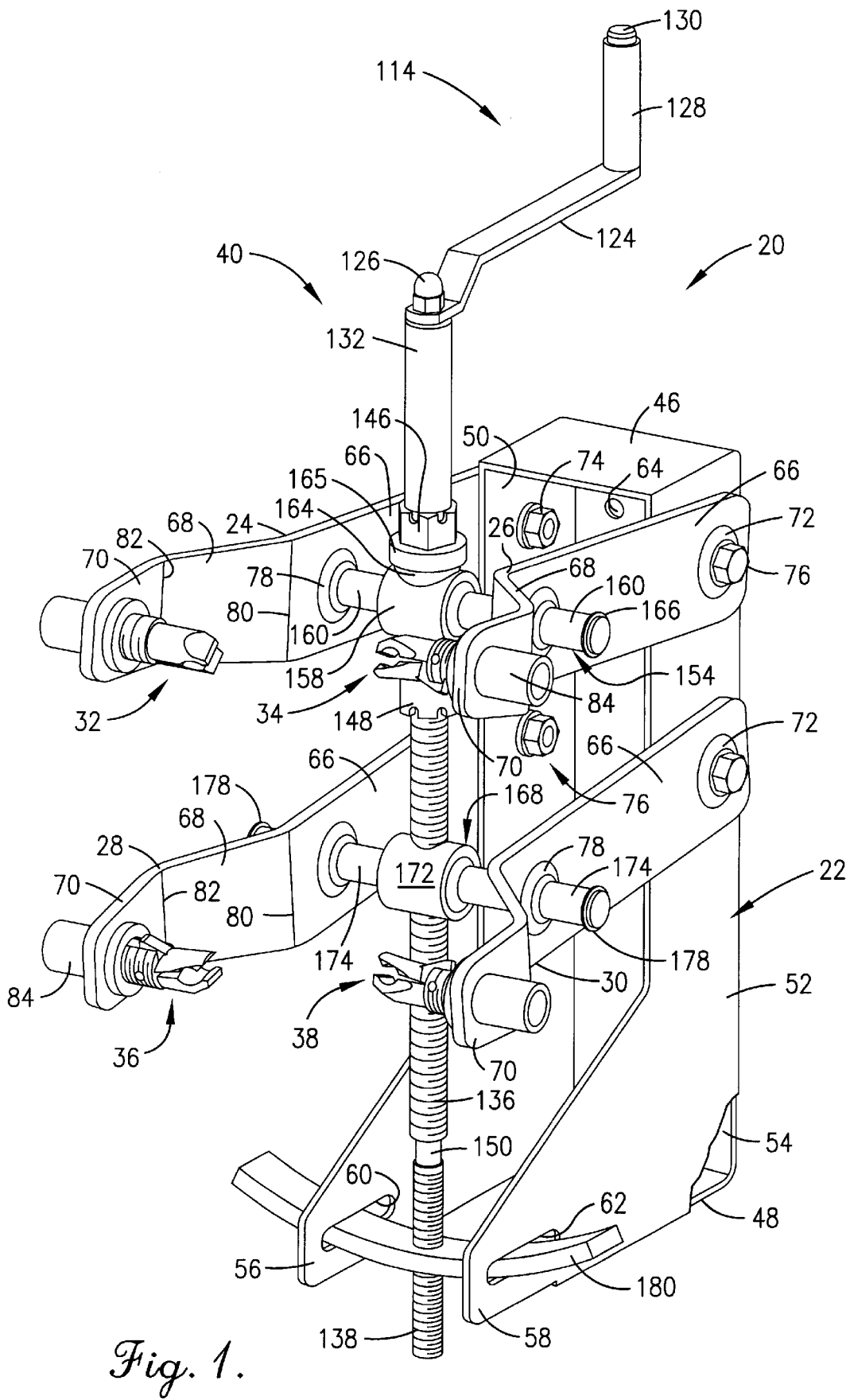
FIG. 1 is a perspective view of a strut spring compressor according to the present invention.

FIG. 1 illustrates a preferred strut spring compressor 20 in accordance with the present invention. The spring compressor 20 includes a support frame 22, a plurality of pivot arms 24, 26, 28, 30, a plurality of spring engagement devices 32, 34, 36, 38, and an actuating mechanism 40 operatively coupled with the pivot arms 24–30 to move the pivot arms relative to each other. The pivot arms 24–30 are pivotally connected to the support frame 22, and the spring engagement devices 32, 38 are attached to the pivot arms 24–30. The spring engagement devices 32–38 engage and hold a spring 42 (FIG. 4) of a strut assembly 44 (FIG. 4), and the actuating mechanism 40 is operated to compress and/or expand the spring 42 whereby it is possible to assemble and disassemble the strut assembly 44.

Figures 5, 11:
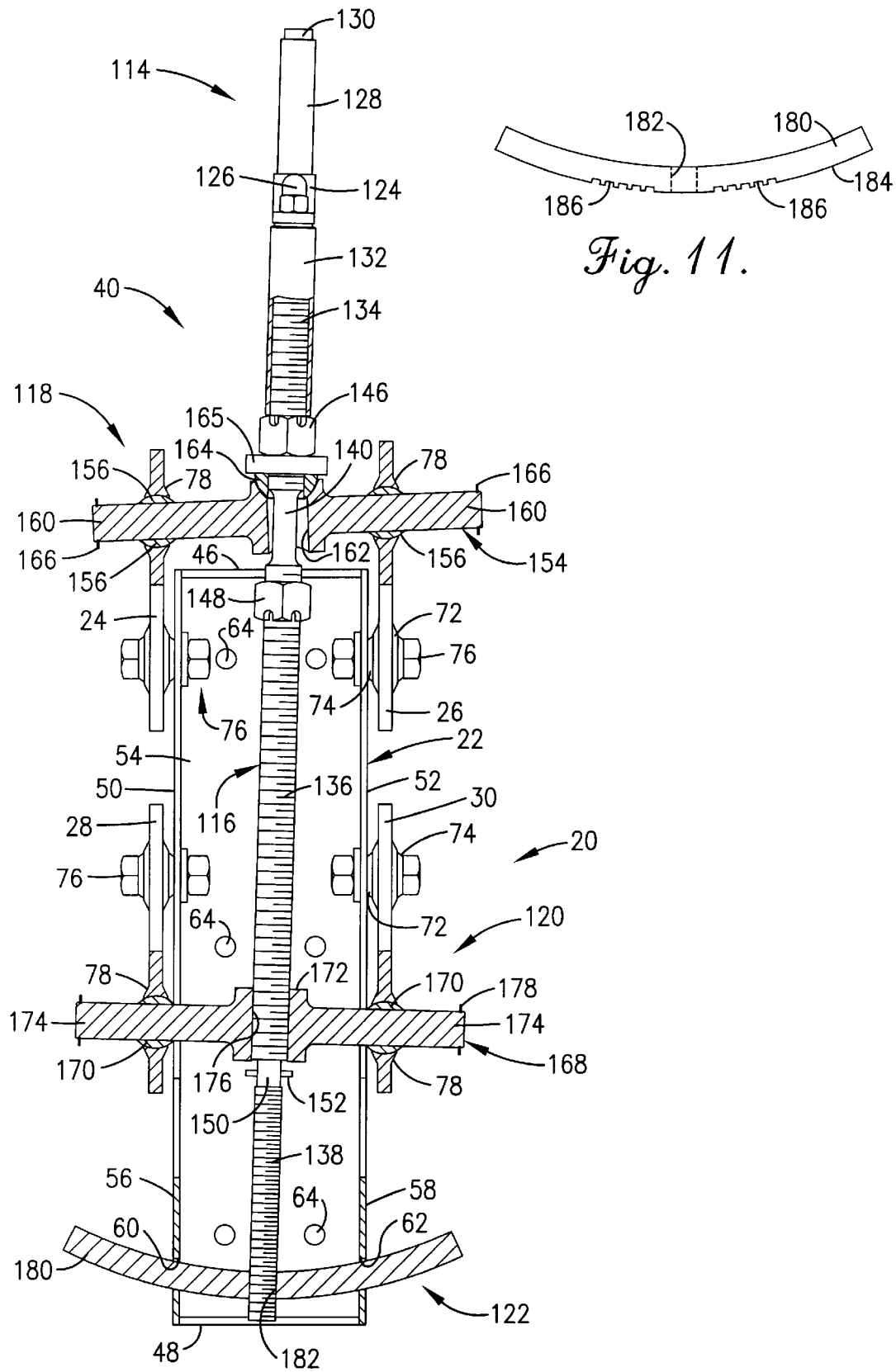
FIG. 5 is a vertical cross-sectional view of the spring compressor of FIG. 1 taken along line 5—5 in FIG. 3.
FIG. 11 is a side elevational view of a bottom trunnion plate according to the present invention.

Referring to FIGS. 1 and 5, the support frame 22 includes a upper end plate 46, a lower end plate 48, a first side plate 50, and a second side plate 52. Each plate is substantially planar, and the upper 46, lower 48, first side 50, and second side 52 plates are all joined at their back edges by a substantially planar rear mounting plate 54. In a preferred construction, the upper end plate 46, lower end plate 48, and rear mounting plate 54 are integrally formed with bends separating the upper and lower end plates from the rear mounting plate. The first and second side plates 50, 52 are then welded to the upper, lower, and rear plates. Together the plates 46–54 form a general box shape which is substantially rigid.

Each of the side plates 50, 52 includes a forwardly extending foot 56, 58 which extend from lower portions of the side plates. Each foot 56, 58 defines a bottom trunnion slot 60, 62 which extend in a direction parallel to the upper and lower end plates 46, 48. The rear mounting plate 54 defines a plurality of wall mounting holes 64, and the bottom plate 48 defines a plurality of bench mounting holes 65 which permit the support frame 22 to be mounted onto a selected mounting surface such as a wall or bench (not shown).

Figure 2:
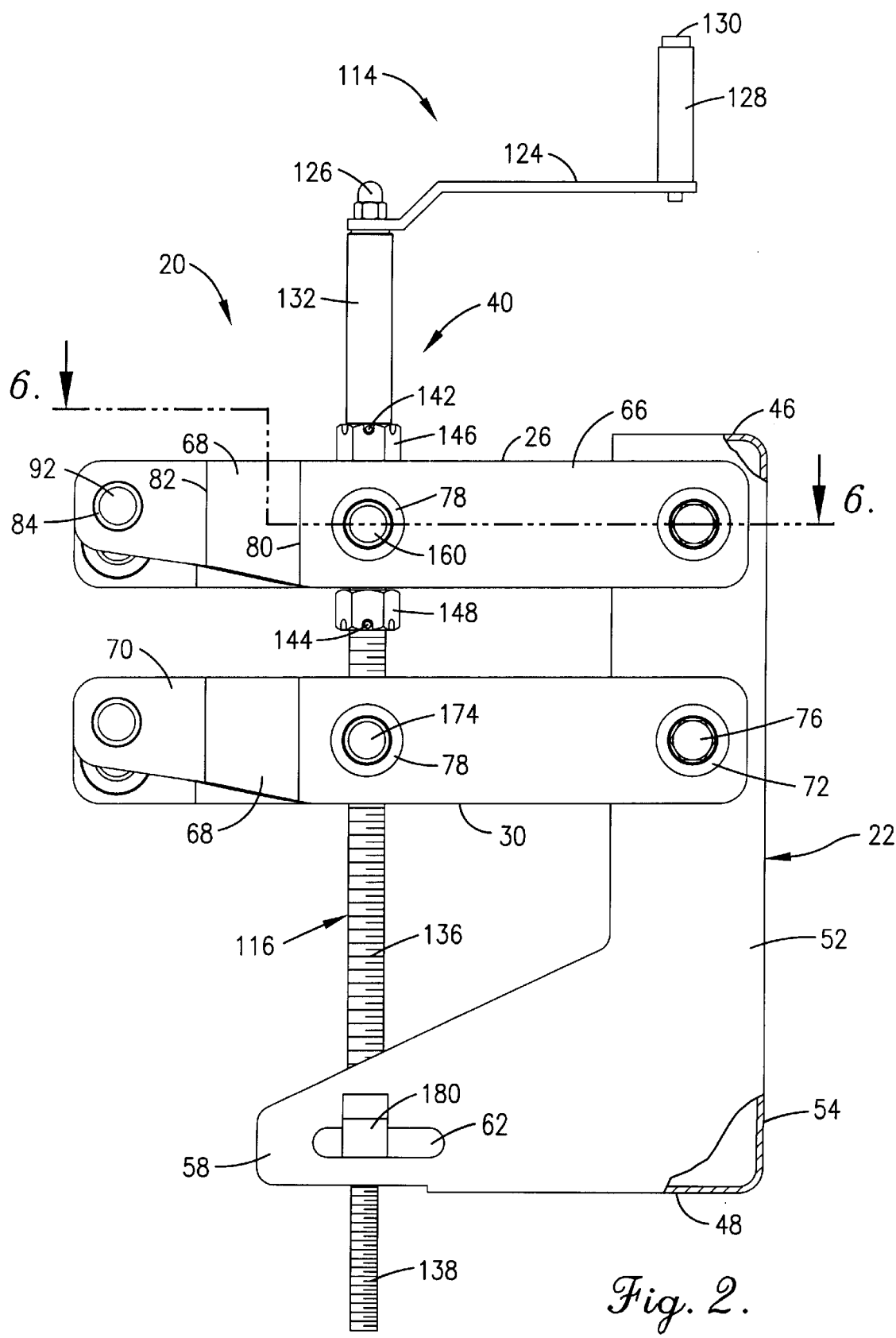
FIG. 2 is a side elevational view of the spring compressor of FIG. 1.
Figure 3:
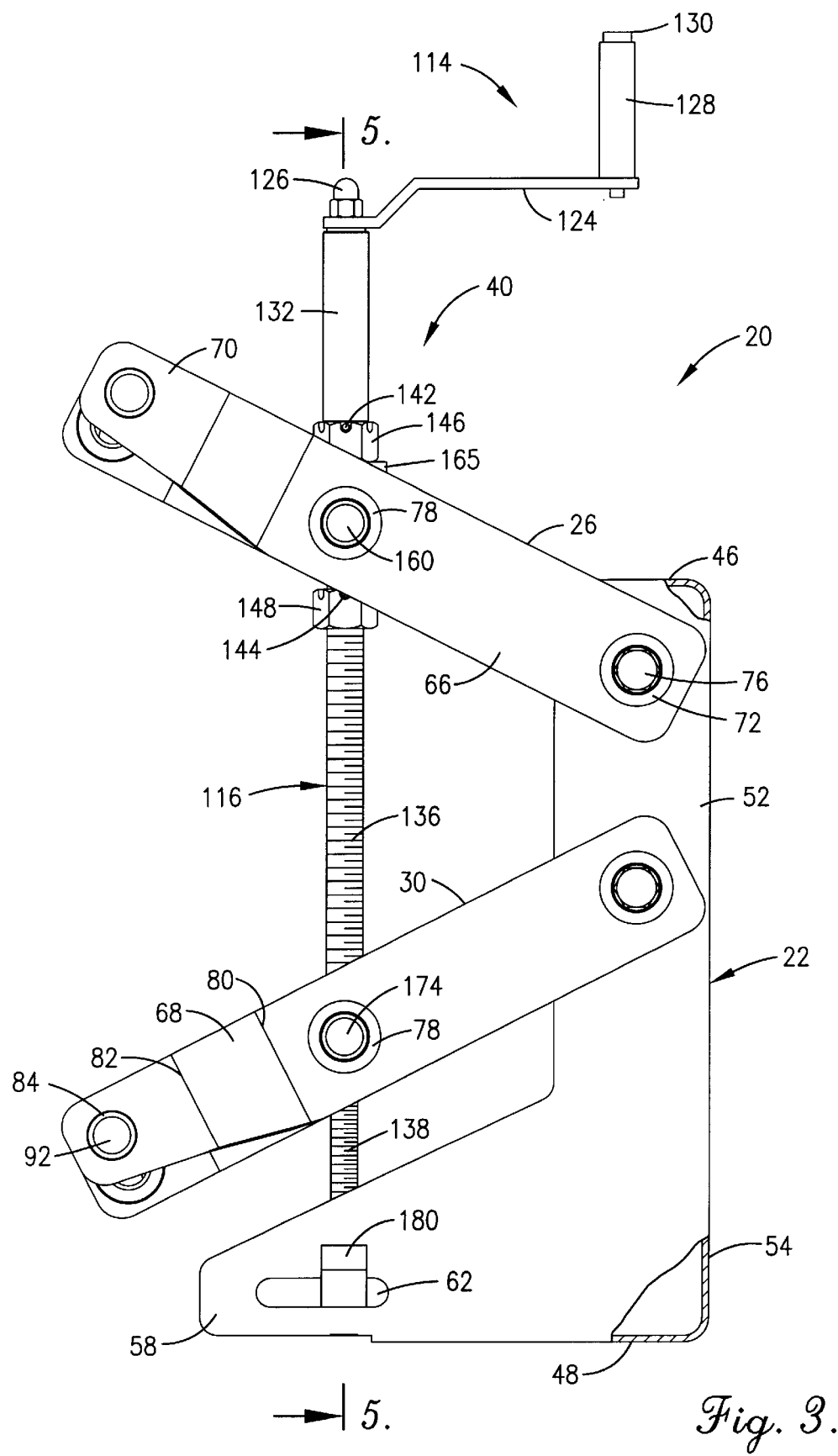
FIG. 3 is a side elevational view of the spring compressor of FIG. 1 illustrating an expanded arm position.

Referring to FIGS. 1, 2, and 3, the pivot arms are substantially rigid and include a first upper pivot arm 24, a second upper pivot arm 26, a first lower pivot arm 28, and a second lower pivot arm 30 with each arm being independently movable of the others. The upper pair of pivot arms 24, 26 are substantially opposite each other and pivotally attached to the support frame 22 near the upper end 46 of the support frame, and the lower pair of arms 36, 38 are substantially opposite each other and pivotally attached to the support frame intermediate the upper and lower ends of the support frame and at a point spaced-apart from the upper arms 24, 26. The first upper and lower arms 24, 28 are pivotally attached to the first side plate 50 and the second upper and lower arms 26, 30 are pivotally attached to the second side plate 52. Because the side plates 50, 52 are substantially planar the first upper arm 24 is positioned substantially above the first lower arm 28, and the second upper arm 26 is positioned substantially above the second lower arm 30. Generally, the upper pair of arms 24, 26 move relative to the lower pair of arms 28, 30, so that the spring 42 can be compressed or expanded therebetween.

Each of the pivot arms 24–30 is substantially identical with the exception of its positioning on the support frame 22 as described above. Therefore, the features of the pivot arms will be described with reference only to the second upper pivot arm 26, and identical reference numerals will be used for the substantially identical features of the pivot arms.

Figure 6:
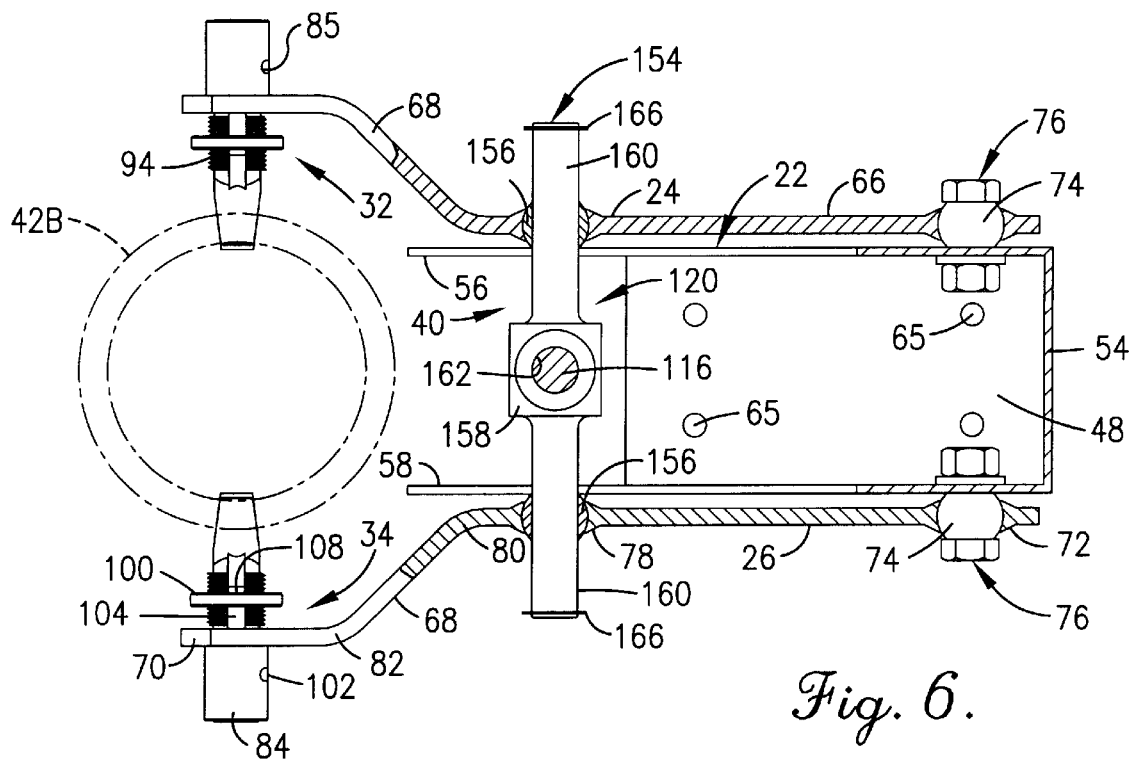
FIG. 6 is a horizontal cross-sectional view of the spring compressor of FIG. 1 taken along line 6—6 in FIG. 2.
Figure 7:
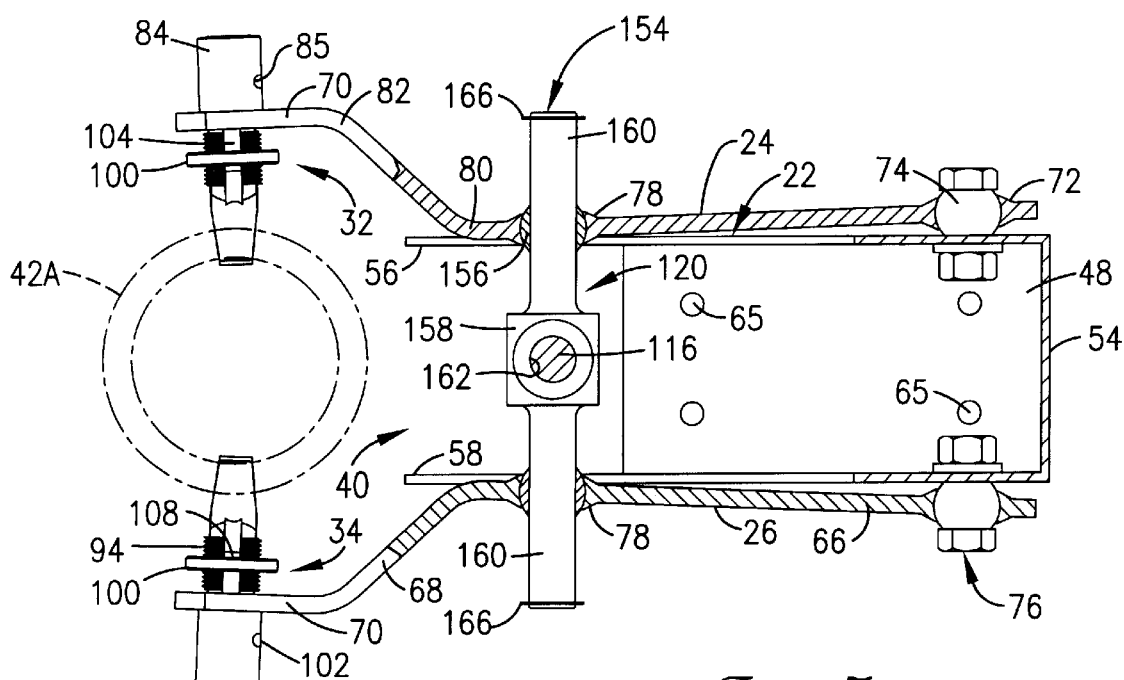
FIG. 7 is a horizontal cross-sectional view of the spring compressor of FIG. 1.
Figure 8:
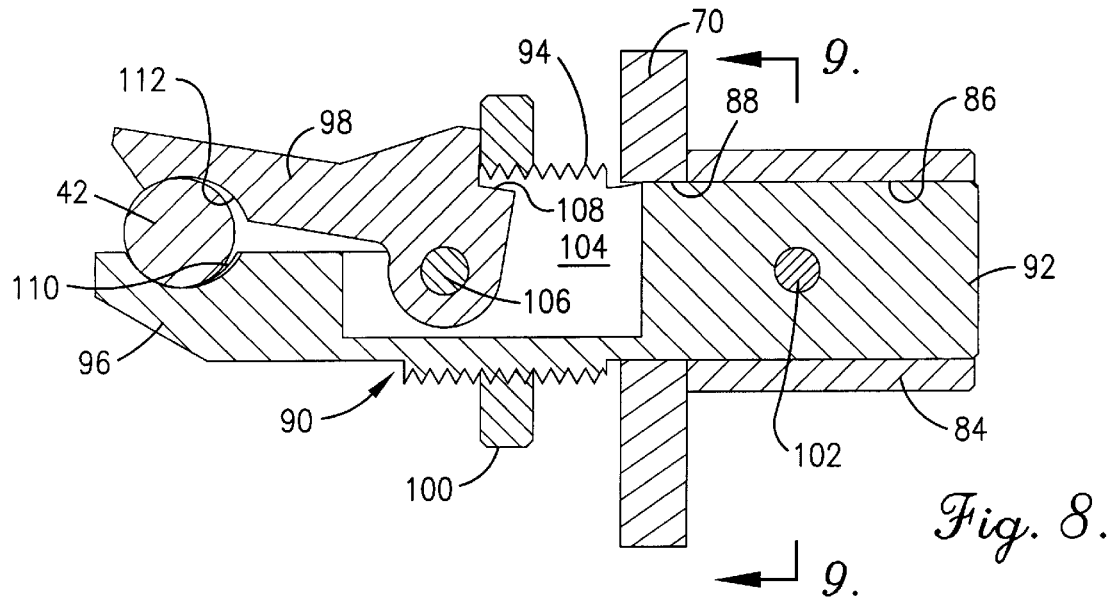
FIG. 8 is a longitudinal cross-sectional view of a spring clamp according to the present invention.
Figure 9:
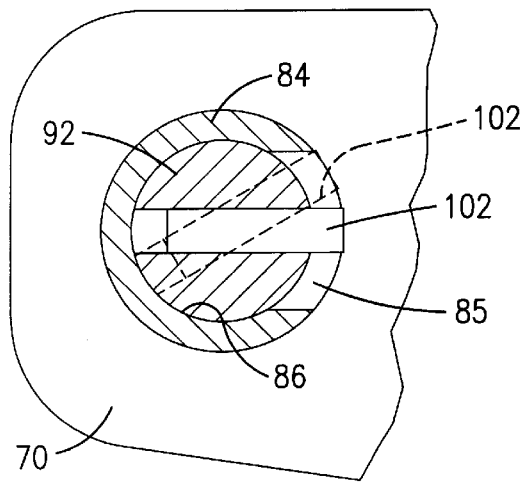
FIG. 9 is a transverse cross-sectional view of the spring clamp of FIG. 8 taken along line 9—9 in FIG. 8.
Figure 10:
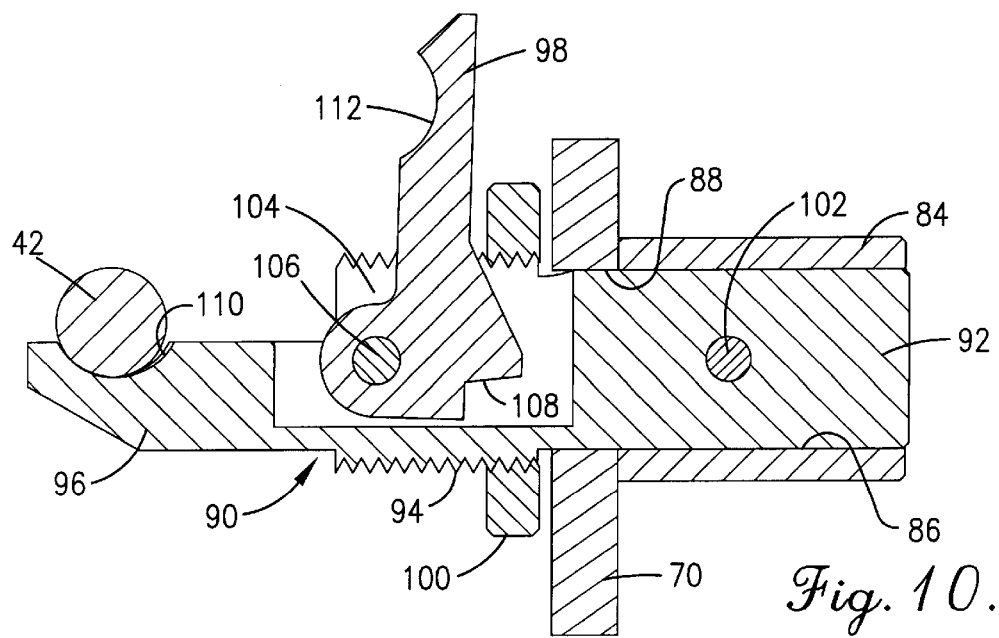
FIG. 10 is a longitudinal cross-sectional view of the spring clamp of FIG. 8 illustrating a clamp finger thereof in a retracted position.

Referring additionally to FIGS. 6 and 7, the pivot arm 26 includes an elongated base section 66, an intermediate angled section 68, and an outwardly spaced section 70 with the intermediate and outwardly spaced sections tapering in height away from the support frame 22. The base section 66 includes a ball joint mount 72 which pivotally mounts the arm 26 to the second side plate 52. The base section 66 is attached to the side plate 52 with a ball joint 74. A fastener assembly 76, preferably including a lock nut and bolt, secures the arm 26 and ball joint 74 to the side plate 52. The base section 66 also includes a pivot bearing mount 78 spaced-apart from the ball joint mount 72 and adjacent to the angled section 68.

The angled section 68 is integral to the base section 66 and is separated therefrom by a first bend 80. The outwardly spaced section 70 is integral to the angled section 68 and is separated therefrom by a second bend 82. The outwardly spaced section 70 has a clamp mounting collar 84 welded thereto for mounting the spring engagement device 34 to the arm 26. The clamp mounting collar 84 is cylindrical and defines a central opening 86 which is aligned with a clamp mount opening 88 defined centrally in the outwardly spaced section 70. The clamp mounting collar 84 defines a pivot slot 85 which will be described below.

Because each of the upper arms is attached to its respective side plate by a ball joint 74, the arms are permitted to pivot away from and toward each other. Thus, the adjustable distance between the outwardly spaced sections 70 of the upper arms 24, 26 can be increased and decreased to accommodate different diameter springs. Thus, as illustrated in FIG. 7, the distance between the spring engagement devices 32, 34 can be reduced to engage a smaller spring 42A, and as illustrated in FIG. 6, the distance between the spring engagement devices 32, 34 can be increased to engage a larger spring 42B. The same holds true for the lower pair of arms 28, 30. By using, on the opposite sides of the frame 22, substantially identical arms which have asymmetrically tapered outwardly spaced sections 70, the centrally positioned clamp mount openings 88 of the upper arms 24, 26 are slightly offset when the arms are at the same angle with respect to the support frame. This offset of the clamp mount openings 88 at least partially compensates for the necessity of attaching the clamps 32, 34 at different points along the height of the spring because of the springs helical configuration. The same feature is utilized for the lower arms 26, 28.

Referring to FIGS. 4 and 8–10, the spring engagement devices preferably comprise a first upper spring clamp 32, a second upper spring clamp 34, a first lower spring clamp 36, and a second lower spring clamp 38 attached to the first upper arm 24, second upper arm 26, first lower arm 28, and second lower arm 30, respectively. Each of the spring clamps 32–38 is substantially similar and attaches to the arms opposite to the support frame 22. Therefore, the spring clamps will be described with reference only to the second upper spring clamp 34, and identical reference numerals will be used for the substantially identical features of the spring clamps 32–38.

The second upper spring clamp 34 includes a pivotal base member 90 having a cylindrical shaft 92, an intermediate threaded portion 94, and a clamp foot 96. The spring clamp 34 also has a clamp finger 98 attached to the base member 90 and a lock collar 100 which threads onto the intermediate threaded portion 94 of the base member 90.

The cylindrical shaft 92 of the base member 90 is rotatably received in the cylindrical central opening 86 of the clamp mount collar 84 and the clamp mount opening 88 to attach the spring clamp 34 to the outwardly spaced section 70 of the arm 26. A pivot restriction pin 102 extends outwardly from the shaft 92 into the pivot slot 85 defined in a rearward portion of the clamp mounting collar 84. Because the clamp 34 is pivotally attached to the arm 26, the clamp can pivot to match the pitch angle of the spring 42. Further, as the spring 42 is compressed or expanded, its pitch angle changes, and the clamp 34 is free to pivot within the range permitted by the pivot slot 85 and compensate for the change in pitch angle.

The intermediate threaded portion 94 of the base member 90 defines a clamp finger receiving slot 104. The clamp finger 98 is pivotally mounted in the clamp finger receiving slot 104 by a pivot pin 106. The clamp finger 98 pivots between a clamped position shown in FIG. 8 and a retracted position shown in FIG. 10. The clamp finger includes a rear notch 108 which is approximately flush with the threaded portion 94 when the clamp finger is in the clamped position. When the clamp finger 98 is in the clamped position, the lock collar 100 is threaded on the intermediate threaded portion 94 until it engages the rear notch 108 thereby locking the clamp finger 98 in the clamped position.

The clamp foot 96 defines an arced strut spring engagement surface 110 which faces generally upwardly. Alternatively, the pivot slot can be formed in the front of the collar or the restriction pin 102 can be moved to the opposite side of the cylindrical shaft to invert the spring clamps. The clamp feet 96 of the clamps 32–38 can be positioned on top or on bottom in any combination desired. In one preferred embodiment, the clamp feet 96 of the upper clamps are positioned on top and the clamp feet of the lower clamps are positioned on bottom to hold the spring between the clamp feet. In the embodiment shown, the pivot restriction pin 102, which extends into the pivot slot 85, inhibits the spring engagement surface 10 from facing downwardly. The pivot restriction pin 102 allows the clamp 34 to rotate until the restriction pin contacts the end of the pivot slot 85 as illustrated in phantom lines in FIG. 9. The clamp finger 98 also defines an arced strut spring engagement surface 112 which when the clamp finger 98 is in the clamped position it is substantially opposite the spring engagement surface 110 of the clamp foot 96. The arced spring surfaces 110, 112 allow the clamp to securely hold the spring coil therebetween without damaging the spring 42. Because the clamp finger pivots relative to the clamp foot the clamp 34 is able to clamp onto springs having different wire diameters.

Referring to FIGS. 1 and 5, the actuating mechanism 40 includes a crank handle 114, a forcing screw 116, a top trunnion assembly 118, a middle trunnion assembly 120, and a bottom trunnion assembly 122. The actuating mechanism 40 operates to provide relative movement between the upper pair of arms 24, 26 and the lower pair of arms 28, 30.

The crank handle 114 includes a torque arm 124 fixedly attached to the forcing screw 116 and secured thereon by a fastener 126. A pivoting collar 128 is mounted around a grip 130 which is attached to the torque arm opposite the forcing screw 116. As an operator turns the forcing screw 116 with the crank handle 114, the pivot collar 128 rotates around the grip 130, so that the operator does not have to adjust his or her grasp during operation. The crank handle 114 also includes a spacing collar 132 to separate the crank handle from and properly position the top trunnion assembly 118.

Referring additionally to FIG. 3, the forcing screw 116 includes an upper threaded portion 134 (FIG. 5), a middle threaded portion 136, and a lower threaded portion 138 all of which preferably comprise right head threads. The upper thread pitch is substantially the same as the middle thread pitch, but the lower thread pitch is preferably twice the middle thread pitch. The upper threaded portion 134 is separated from the middle threaded portion 136 by a top trunnion pivot section 140. The pivot section 140 has a reduced diameter and is not threaded. The upper threaded portion 134 includes an upper lock pin 142, and the middle threaded portion 136 includes a middle lock pin 144. The upper lock pin 142 operates to fix an upper nut 146, and the middle lock pin 144 operates to fix a middle nut 148. The upper and middle nuts 146, 148 operate to position the upper trunnion assembly 118 on the forcing screw 116. Alternatively, the middle unit can be replaced by a washer which rests on the lock pin 144. In this embodiment, the lock pin 144 is preferably moved upwardly on the forcing screw 116. The forcing screw 116 also includes a separation section 150 between the middle threaded portion 136 and the lower threaded portion 138. A positioning pin 152 extends through the separation section 150 to limit the downward movement of the middle trunnion assembly 120.

Referring exclusively again to FIGS. 1 and 5, the top trunnion assembly 118 includes a cylindrical top trunnion 154 and a pair of top pivot bearings 156. The trunnion 154 includes a central cylindrical body 158 having coaxial legs 160 extending outwardly in substantially opposite directions therefrom. The legs extend through the top pivot bearings 156 and slide therein. The pivot bearings 156 are held by the pivot bearing mounts 78 of the upper arms 24, 26 and are free to pivot inside of the pivot bearing mounts. The center body 158 has a larger diameter than the legs 160 and defines a generally vertical and cylindrical top opening 162 for receiving the pivot section 140 of the forcing screw 116 therethrough. The top opening 162 is larger than the pivot section 140 and opens wider to matingly receive a generally spherical seat 164. The seat 164 is engaged by a thrust bearing 165, and the thrust bearing 165 is engaged by the upper nut 146. Because the top trunnion 154 can pivot on the thrust bearing 164 and because the top opening 162 is larger than the pivot section 140, the top trunnion 154 pivots relative to the forcing screw 116.

With the arms 24, 26 attached to the support frame 22 by the ball joints 74 which permit three-dimensional movement of the arms and with the pivot bearings being able to slide over the top trunnion legs 160, the distance between the arms 24, 26 can be adjusted to accommodate different sizes of springs. Thus, the upper arms can be pivoted away from and toward each other to move the outwardly spaced sections 70 of the arms farther apart or closer together as desired. Snap rings 166 or alternatively cotter pins are attached to the ends of the top trunnion legs 160 to inhibit the arms from sliding off the ends of the legs 160. The middle nut 148 inhibits the top trunnion 154 from sliding down around the middle threaded portion 136 of the forcing screw 116. Because the upper clamps 32, 34 are offset from each other, the top trunnion remains substantially horizontal even though the upper clamps are attached at different points along the height of the spring.

The middle trunnion assembly 120 includes a middle trunnion 168 and a pair of middle pivot bearings 170. The middle trunnion 168 has a centrally located cylindrical body 172 with coaxial cylindrical legs 174 of reduced diameter extending from opposite sides of the middle body 172. The middle body defines a centrally located middle threaded opening 176 which threadably receives the middle threaded portion 136 of the forcing screw 116. Similarly to the top trunnion assembly 118, the middle trunnion legs 174 are slidably received in the middle pivot bearings 170 which are in turn held by the pivot bearing mounts 78 of the lower pair of arms 28, 30. Further, the pivot bearings are free to pivot inside of the pivot bearing mounts. With the lower pair of arms 28, 30 pivotally attached to the support frame 22 by ball joints 74 and with the middle trunnion legs 174 slidably received in the middle pivot bearings 170, the middle trunnion assembly 120 and the forcing screw 116 are free to pivot relative to the support frame 22 as well as the upper arms 24, 26 and the top trunnion assembly 118. Again, to inhibit the lower pair of arms 28, 30 from sliding off the middle trunnion legs 174, middle snap rings 178 are attached to the ends of the middle trunnion legs 174, and the middle trunnion remains substantially horizontal because of the offset lower clamps 36, 38.

Referring to FIGS. 1, 5, and 11, the bottom trunnion assembly 122 includes an arcuate trunnion plate 180 slidably received in the trunnion slots 60, 62 of the feet 56, 58 extending forwardly from the first and second side plates 50, 52. The plate 180 defines a centrally located opening 182 which threadably receives the lower threaded portion 138 of the forcing screw 116. Thus, the bottom trunnion assembly 122 is threadably connected to the forcing screw 116. The trunnion slots 60, 62 are sized with a length permitting the plate 180 to slide forward and backward in the directions toward and away from the rear mounting plate 54. Further, the arcuate plate can slide from side to side thereby allowing the forcing screw 116 to pivot relative to the support frame 22. Because the middle trunnion assembly 120 and the bottom trunnion assembly 122 both threadably engage the forcing screw 116, the middle and bottom trunnion assemblies pivot together. With the top trunnion assembly 118 pivotally attached to the upper arms 24, 26 and the middle trunnion assembly 120 pivotally attached to the lower arms 28, 30, the upper and middle trunnion assemblies are free to pivot independently of each other. Alternatively, as illustrated in FIG. 11, the bottom surface 184 may define a plurality of rectangular lock slots 186 which operate to catch in the trunnion slots 60, 62 to inhibit further side-to-side motion of the arcuate plate 180 while still permitting the plate 180 to slide forward and backward.

Figure 4:
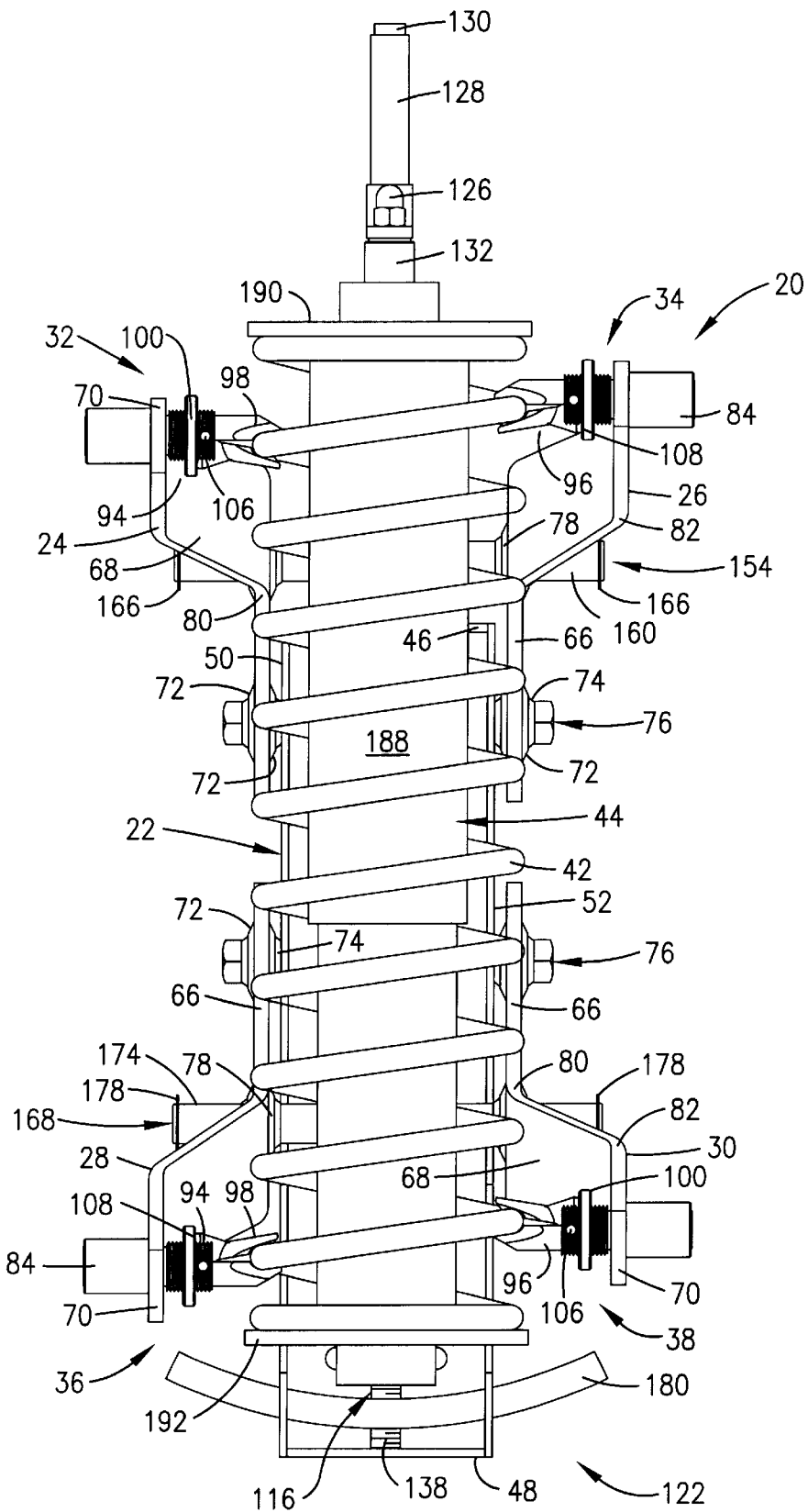
FIG. 4 is a front elevational view of the spring compressor of FIG. 1 illustrating a strut assembly held therein.

In operation, and with reference to FIGS. 2, 3, and 4, the strut assembly 44 (FIG. 4) is placed in position in the compressor 20 with the spring 42 (FIG. 4) resting on the clamp feet 96 of the upper clamps 32, 34. One of the clamp fingers 98 is then pivoted to the clamped position and the locking collar 100 is threaded along the intermediate threaded portion 94 until it engages the notch 108 in the clamp finger 98 to lock the clamp finger 98 in its clamped position. The remaining arms are positioned as desired to attach the upper clamps 32, 34 near the top of the spring 42 and the lower clamps 36, 38 near the bottom of the spring. Because the top and middle trunnion assemblies are pivotally attached to the arms, the first upper arm 24 can be positioned at a different height along the spring than the second upper arm 26, and the first lower arm 28 is positionable at a different point along the height of the spring 42 than the second lower arm 30. However, the elevational differences between the upper arms and between the lower arms are minimized by the offset clamps.

With the spring clamps clamped onto the spring, the crank handle 114 is then operated to rotate the forcing screw 116. To further compress the spring, the forcing screw 116 is rotated clockwise, and to expand the spring, the forcing screw is rotated counter-clockwise. The torque arm 124 is sufficiently long to allow an operator to compress a strut spring without application of excessive force. Because the lower thread pitch on the lower threaded portion 138 is twice the middle thread pitch on the middle threaded portion 136, the arms all maintain substantially the same magnitude of angle with respect to horizontal and the support frame as illustrated in FIGS. 2 and 3. In FIG. 2 all four arms are substantially horizontal when they are close together, and in FIG. 3 all four arms at an angle magnitude of approximately 30° with respect to horizontal. Specifically, as the forcing screw 116 is turned counter-clockwise eight revolutions, the lower arms 28, 30, which are attached to the middle threaded portion, move one inch down relative to the forcing screw. At the same time, the entire four-arm assembly moves up one-half inch. Thus, the net movement of the upper arms is one-half inch upwardly, and the net movement of the lower arms is one-half inch downwardly.

With the spring compressed, the shock 188 (FIG. 4) of the strut assembly 44 can be removed and replaced. If desired, the spring tension can be released, and the spring removed and discarded. If necessary, the spring clamps can be used to clamp on to the top and/or bottom spring seats 190, 192 (FIG. 4) of the strut assembly.

The strut spring compressor 20 of the present invention can be adjusted to receive a variety of strut assemblies utilizing springs having different overall diameters, pitches, lengths, wire diameters, and spring forces. The spring clamps securely clamp onto the spring without damaging it thereby insuring the safety of the operator and surrounding property.

We claim:

1. A spring compressor comprising:

a substantially rigid support frame having a first side and a second side opposite the first side;

a plurality of arms movably attached to the support frame;

a plurality of spring engagement devices for engaging a spring the spring engagement devices being attached to the arms; and an actuating mechanism operably coupled with the plurality of arms to move the arms relative to each other and the support frame, the plurality of arms including a first upper arm attached to the first side of the support frame and a second upper arm attached to the second side of the support frame generally opposite the first upper arm, the first upper arm being independently movable relative to the second upper arm, the plurality of arms further including a first lower arm attached to the first side of the support frame and a second lower arm attached to the second side of the support frame, the first lower arm being spaced apart from the first upper arm, the second lower arm being generally opposite the first lower arm and spaced apart from the second upper arm, each of the arms being independently movable from each of the other arms, said actuating mechanism including a force screw having a lower threaded portion and a middle threaded portion, a middle trunnion assembly threadably receiving the middle threaded portion and pivotally engaging the lower arms, a bottom trunnion assembly threadably receiving the lower threaded portion and movably engaging the support frame, and the middle and bottom trunnion assemblies being operable to permit the lower arms to pivot relative to the support frame.

2. The spring compressor according to claim 1 wherein the actuating mechanism further includes a top trunnion assembly pivotally coupled with the forcing screw, and the top trunnion assembly pivotally engages the upper arms, so that the upper arms pivot relative to the forcing screw and the lower arms.

3. The spring compressor according to claim 1 wherein the middle threaded portion comprises a middle thread pitch, and the lower threaded portion comprises a lower thread pitch twice the middle thread pitch.

4. A spring compressor comprising:

a substantially rigid support frame having a first side and a second side opposite the first side;

a plurality of arms movably attached to the support frame;

a plurality of spring engagement devices for engaging a spring the spring engagement devices being attached to the arms; and an actuating mechanism operably coupled with the plurality of arms to move the arms relative to each other and the support frame, each arm of the plurality of arms being attached to the support frame by a ball joint permitting the arms to pivot three dimensionally.

5. A spring compressor comprising:

a substantially rigid support frame having a first side and a second side opposite the first side;

a plurality of arms movably attached to the support frame;

a plurality of spring engagement devices for engaging a spring, the spring engagement devices being attached to the arms; and an actuating mechanism operably coupled with the plurality of arms to move the arms relative to each other and the support frame, said actuating mechanism comprising a bottom trunnion assembly and a forcing screw having a lower threaded portion, and the bottom trunnion assembly threadably receiving the lower threaded portion and movably engaging the support frame.

6. A spring compressor comprising:

a substantially rigid support frame having a first side and a second side opposite the first side;

a plurality of arms movably attached to the support frame;

a plurality of spring engagement devices for engaging a spring, the spring engagement devices being attached to the arms; and an actuating mechanism operably coupled with the plurality of arms to move the arms relative to each other and the support frame, said attachment mechanism including a forcing screw and a bottom trunnion assembly threadably receiving the forcing screw, each side of the support frame defining a bottom truminion slot, and the bottom trunnion assembly including an arcuate trunnion plate slidably received in the bottom trunnion slots.

7. The spring compressor according to claim 6 wherein the trunnion plate is slidable from side to side and from front to back, and the trunnion plate includes a plurality of lock slots on a lower surface thereof.

8. A spring compressor comprising:

a substantially rigid support frame having an upper end and a lower end;

at least one upper arm movably attached to the support frame near the upper end of the support frame;

at least one lower arm attached to the support frame at a point spaced apart from the upper end of the support frame;

at least one upper spring clamp for clamping onto a strut spring near a strut spring top, the upper spring clamp being attached to the at least one upper arm generally opposite to the support frame;

at least one lower spring clamp for clamping onto the strut spring at a point spaced apart from the upper spring clamp, the lower spring clamp being attached to the at least one lower arm generally opposite to the support frame; and an actuating mechanism operatively coupled with the at least one upper arm and the at least one lower arm to move the at least one upper arm relative to the at least one lower arm, said upper spring clamp including a pivotal base member pivotally attached to the at least one upper arm, and a clamp finger attached to the base member and being movable between a clamped position and a retracted position.

9. The spring compressor according to claim 8 wherein the upper spring clamp further includes a lock collar engaging the clamp finger to lock the clamp finger in the clamped position, and the base member and the clamp finger define cooperating arced strut spring engagement surfaces.

10. A spring compressor comprising:

a substantially rigid support frame having a first side and a second side opposite the first side;

a plurality of arms movably attached to the support frame;

a plurality of spring engagement devices for engaging a spring, the spring engagement devices being attached to the arms; and an actuating mechanism operably coupled with the plurality of arms to move the arms relative to each other and the support frame, at least one said spring engagement devices including a clamp comprising a base member attached to an arm, a clamp finger pivotal on the member between a raised position in which the finger is generally disposed at a right angle to the member to expose the member and a clamped position in which the finger is generally disposed parallel to and overlying the member, and a locking collar threadably movable along the base member for releasably retaining the finger in its clamped position.

* * * * *